R. VUILLEUMIER.
APPARATUS FOR AND METHOD OF HEAT DIFFERENTIATION.
APPLICATION FILED MAY 14, 1914.
1,321,343.
Patented Nov. 11, 1919.
6 SHEETS—SHEET 1.
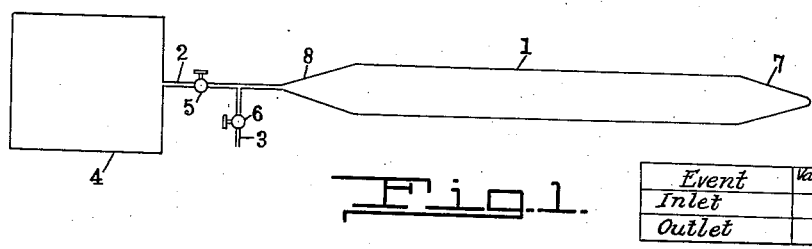
Fig. 1.
| Event | Valves open |
|---|---|
| Inlet | 5 |
| Outlet | 6 |
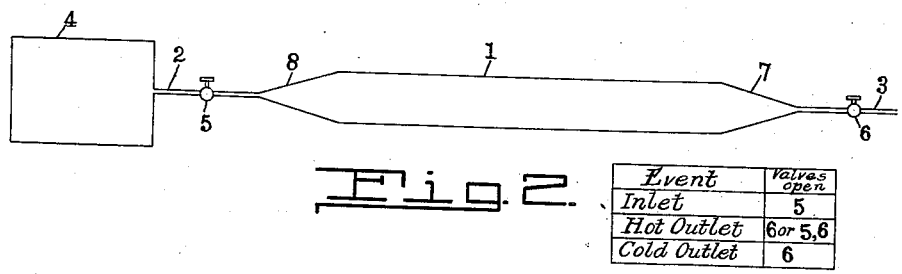
Fig. 2.
| Event | Valves open |
|---|---|
| Inlet | 5 |
| Hot Outlet | 6 or 5,6 |
| Cold Outlet | 6 |
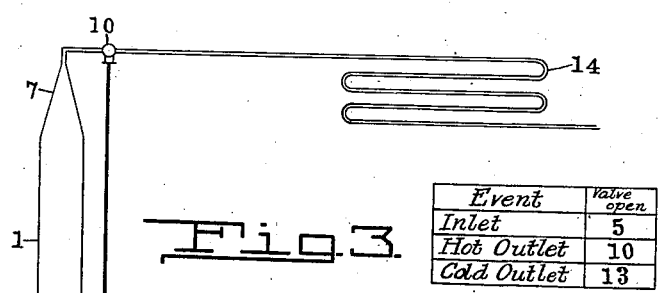
Fig. 3.
| Event | Valve open |
|---|---|
| Inlet | 5 |
| Hot Outlet | 10 |
| Cold Outlet | 13 |
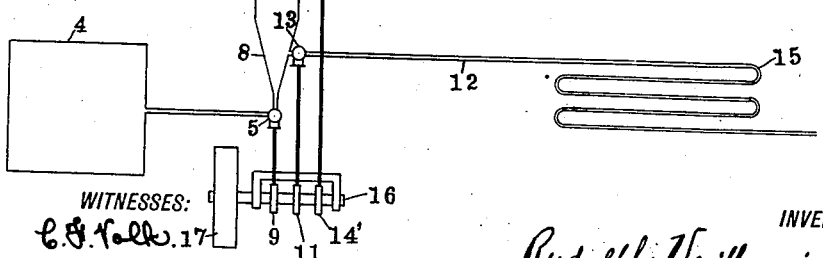
WITNESSES:
C. F. Volk
J. Thomson
INVENTOR
Rudolph Vuilleumier
BY
Dull, Barfield & Dull
ATTORNEYS R. VUILLEUMIER.
APPARATUS FOR AND METHOD OF HEAT DIFFERENTIATION.
APPLICATION FILED MAY 14, 1914.

1,321,343.

Patented Nov. 11, 1919.
6 SHEETS—SHEET 4.

| Event | Valves open |
|---|---|
| Inlet | 24 |
| Hot Outlet | 10 |
| Cold Outlet | 13 |

WITNESSES:

INVENTOR
Rudolph Vuilleumier
BY
ATTORNEYS

R. VUILLEUMIER.
APPARATUS FOR AND METHOD OF HEAT DIFFERENTIATION.
APPLICATION FILED MAY 14, 1914.

1,321,343.

Patented Nov. 11, 1919.
6 SHEETS—SHEET 5.

| Event | Valve open |
|---|---|
| Inlet | 5 |
| Hot Outlet | 10 |
| Cold Outlet | 13 |

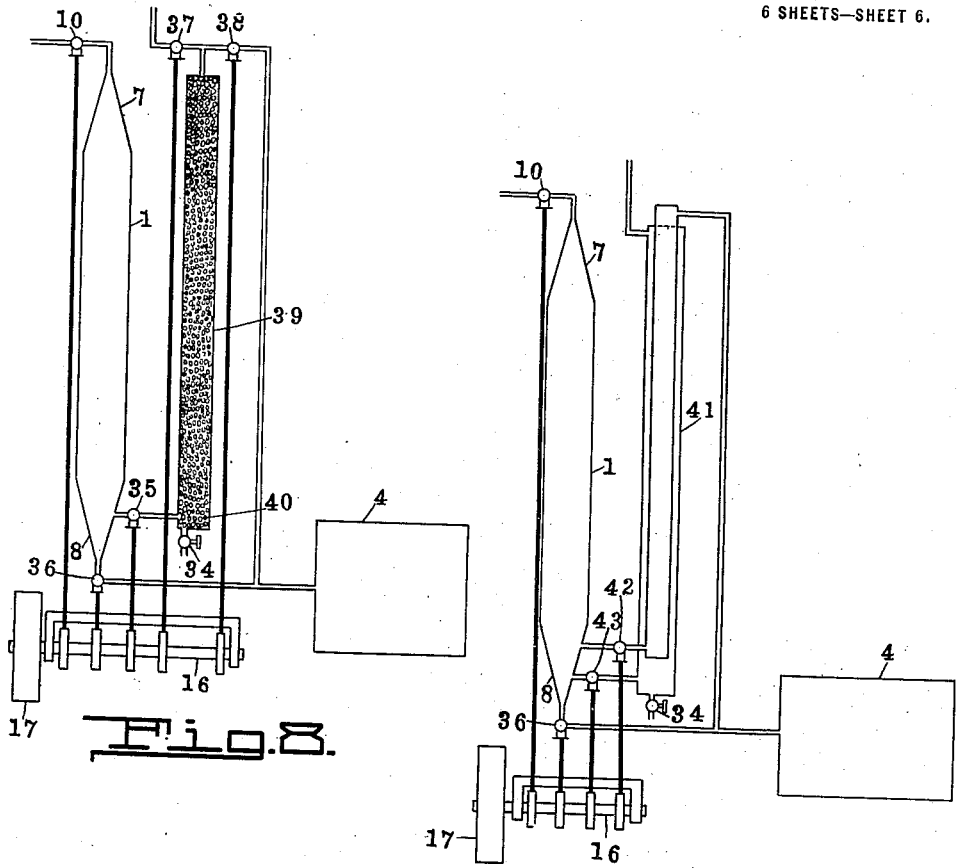

UNITED STATES PATENT OFFICE.

RUDOLPH VUILLEUMIER, OF NEW ROCHELLE, NEW YORK, ASSIGNOR TO THE SAFETY CAR HEATING AND LIGHTING CO., OF NEW YORK, N. Y., A CORPORATION OF NEW JERSEY.

APPARATUS FOR AND METHOD OF HEAT DIFFERENTIATION.

1,321,343.   Specification of Letters Patent.   Patented Nov. 11, 1919.

Application filed May 14, 1914. Serial No. 838,475.

*To all whom it may concern:*

Be it known that I, RUDOLPH VUILLEUMIER, a citizen of the United States, residing at New Rochelle, in the county of Westchester and State of New York, have invented certain new and useful Improvements in Apparatus for and Methods of Heat Differentiation, of which the following is a full, clear, and exact description, such as will enable others skilled in the art to which it appertains to make and use the same.

This invention relates to thermodynamic apparatus, and with regard to certain more specific features, to apparatus adapted for mechanical cooling or heating or for effecting simultaneously a cooling and a heating operation, and improvements in method of heat utilization. Certain features herein shown are not specifically claimed herein, but are claimed in one or more divisional applications.

One of the objects of the invention is to provide efficient and practical refrigerating means which shall be economical in consumption of power and readily adaptable to the liquefaction of air and other gases. Another object is to provide inexpensive and reliable refrigerating apparatus in which the energy abstracted in cooling the heated portions is made useful as for heating purposes. Another object is to provide a durable and simple heating device of high thermal efficiency. Another object is to provide commercially practical apparatus in which the heat-content of the working fluid is caused to be unequally distributed and the portions of respectively increased and decreased heat-content separated before the heat-content has resumed its former condition of distribution throughout the fluid. Another object is to provide refrigerating apparatus of simple construction in which losses of the magnitude encountered in apparatus hitherto devised are largely eliminated. Other objects will be in part obvious and in part pointed out hereinafter.

In general, this invention relates to that class of apparatus in which a heat differentiation is effected by the use of a compressed gas, the alternate compression and expansion of which is utilized to produce changes of temperature. Well known examples of this are the various forms of apparatus employing ammonia or sulfurous acid in commercial ice processes; these usually depend upon condensing the vapor of ammonia or sulfurous acid by mechanical power, in which process considerable heat is developed which is removed by ordinary condensing means, such as passing the condensed liquid through pipes over which water flows; the condensed and cooled liquid is then conveyed to suitable expansion apparatus and produce cold, usually in a surrounding medium, such as a calcium chlorid or other brine which only freezes at low temperature. In my improved process, however, this cycle of operations is not followed, but instead I condense a gas pressure, not usually so far as to make it a liquid, and in a succession of single integral bodies of gas, segregate the hot portions in one part of suitable apparatus and the cooler portions in another part, without any physical separation between them; applying the hot portions, if desired, to suitable work requiring heat and the cooler portions to suitable work requiring cold. It is within my invention of course to carry on a succession of these operations in series, according to the object to be attained; that is, to use the hot air from one apparatus in another by which it will be still further heated, or the cold air in another by which it will be still further cooled, or both, and so on until the desired extremes of temperature are procured. In this way very great heat may be obtained or gases may be liquefied by the cold, according as the process is run for heat or cold. I also show in this case means by which a part of the stored energy in the gas content of the apparatus may be conserved, thereby diminishing the power required to run the apparatus and obtain the desired results; indeed the losses with properly constructed apparatus embodying my invention, are small, and the efficiency is higher than that of any apparatus for attaining the same objects with which I am familiar.

In the accompanying drawings, wherein are shown diagrammatically one or more of various possible embodiments of the several features of the invention, together with such explanatory diagrams as will facilitate an understanding of the same, Figure 1 illustrates, by way of preliminary explanation, an apparatus in which certain of the events in the cycle of operations of the preferred form of apparatus may be effected.

Fig. 2 is a modification of Fig. 1, conforming more closely to the preferred form of apparatus.

Fig. 3 shows in diagrammatic form the apparatus of Fig. 2, with means for effecting automatically a suitable sequence of events.

Figure 4:
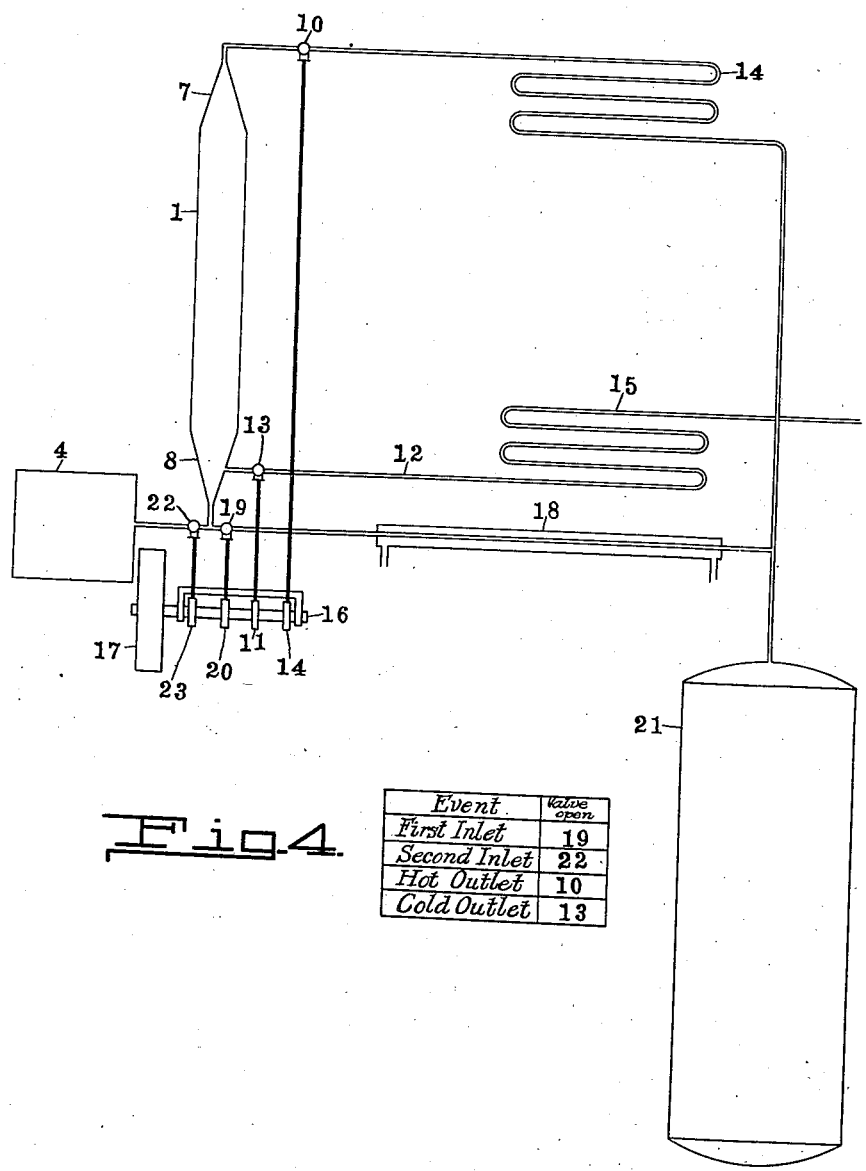

In Fig. 4 the apparatus of Fig. 3 has been modified by providing a closed circuit for the heated fluid.

Figure 5:
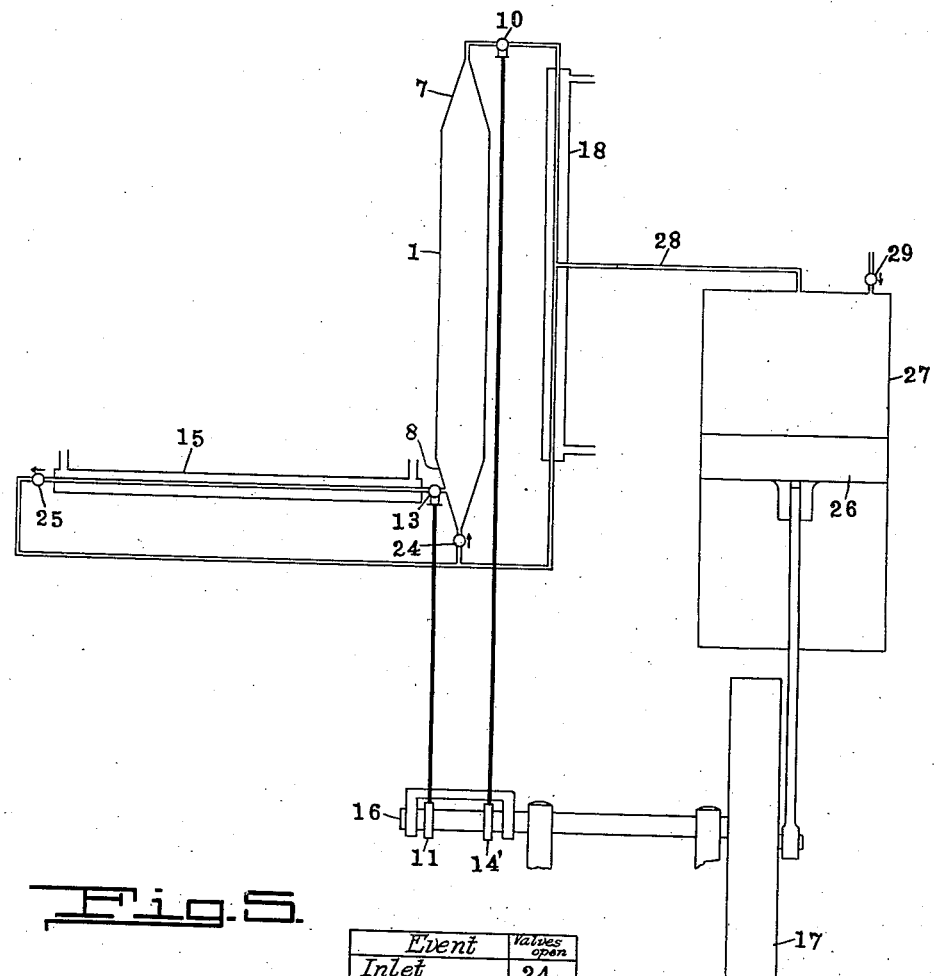

Fig. 5 is a further modification illustrating closed circuits for both the heated and the cooled portions of the fluid.

Figure 6:
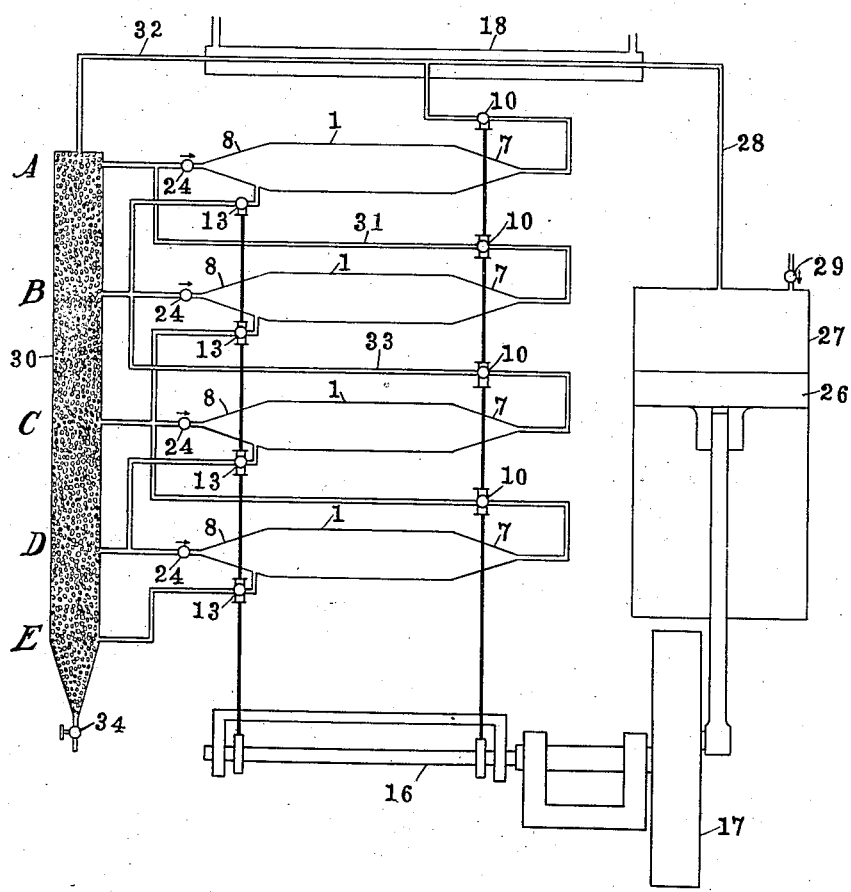

Fig. 6 shows a preferred form of apparatus for obtaining a higher ratio of temperature range to pressure range, by multiplying certain elements of the apparatus of Fig. 5.

Figure 7:
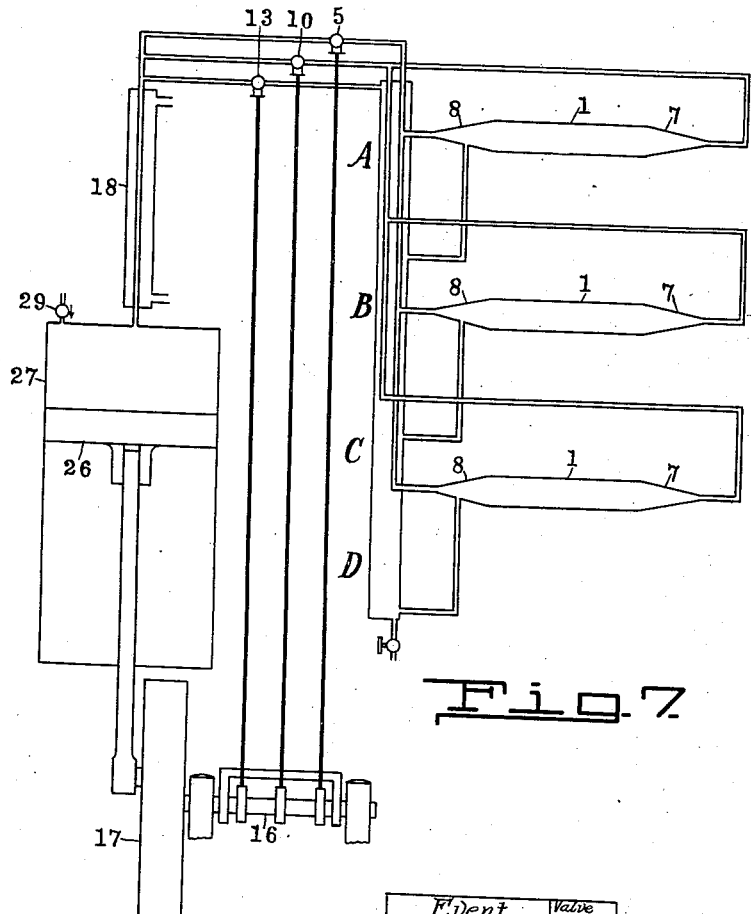

Fig. 7 is a modification of Fig. 6, illustrating a recuperator instead of a regenerator as a heat-transferring means.

In Fig. 8 is illustrated apparatus of the type of Fig. 3, with certain additions in the nature of a counter-current heat-transferring device.

Fig. 9 is a modification of Fig. 8, showing the use of a modified form of heat-transferring means.

Similar reference characters refer to similar parts throughout the several views of the drawings.

As conducive to a clearer understanding of the several features of the invention hereinafter described, it may be stated that there has long been an insistent demand for reliable and inexpensive refrigerating apparatus for the attainment of low temperatures, such as that of liquid air, as well as for work requiring higher but still sub-normal temperatures. In ice machines for example, the energy efficiency is remarkably low compared to many other classes of apparatus, although there is at the present time no particular difficulty in operating with the comparatively small temperature range required for such work. But as lower temperatures are demanded, the energy efficiency of present-day apparatus is far less even than in ice-making machines and the apparatus is more complicated, more expensive and less available for work outside a laboratory. For the still lower temperatures required in the liquefaction of gases, such as air, oxygen, nitrogen and hydrogen, the extremely high degree of low efficiency and high degree of the complication of the apparatus now in the market has made impracticable any extensive use or inexpensive manufacture of the products of such machines. In the present invention, as exemplified in the apparatus herein described, there is shown a type of machine differing from those heretofore available not only in its simplicity and high efficiency, but in its mode of operation.

According to certain preferred embodiments of the present invention, apparatus is provided for utilizing periodically a quantity of fluid, altering the conditions in this fluid in such a way as to increase the heat-content of portions and decrease the heat-content of other portions, and then before an appreciable amount of this heat differentiation has been neutralized, as by convection and radiation between the heated and cooled portions, the two portions are separated from each other, the heated portion giving up its heat later in one part of the apparatus while in another part the cooled portion of the fluid is available for use in whatever way it may be needed. The apparatus therefore comprises what may be termed a "heat differentiator" to distinguish it from the various types of apparatus operating on other thermodynamic cycles. The prior art is replete with embodiments of such cycles involving usually the conversion of heat energy into work, or vice versa, with the inherent loss of power and complication of apparatus attendant upon such conversion. In apparatus made according to the present invention, the working fluid itself is separated into a heated part and a cooled part, and the two parts put to whatever use may be required of them. While much, if not all of the apparatus herein illustrated or described, may be operated with any suitable fluid, the working fluid will be in general a gas, usually air.

Referring now more particularly to the accompanying drawings, there is illustrated diagrammatically in Fig. 1 an apparatus exemplifying by way of introduction certain of the principles of the present invention. In this figure there is illustrated at 1 a chamber or cylinder, preferably of fixed dimension, provided with an inlet pipe 2 and an outlet pipe 3. The inlet pipe 2 leads from a source 4 of gas which is maintained at constant pressure by means not shown. The admission of fluid from the source 4 to the chamber 1 may be regulated by opening and closing the inlet valve 5 in the inlet pipe 2. Gas that is in the chamber 1 may be discharged into the atmosphere through the outlet pipe 3, under the control of a suitable outlet valve 6. Assume now merely for purposes of illustration that the value of the pressure maintained constant in the source 4 is ten atmospheres, that the inlet and outlet valves 5, 6 are both closed, with the fluid in the chamber at atmospheric pressure, and all parts of the apparatus as well as the supply gas and chamber gas at a room temperature of 60° F. (It may be noted that the pressure and temperature figures taken herein are assumed and are used as illustrative.) If now the inlet valve 5 be opened, the gas from the source 4 will pass through the inlet pipe 2 into the chamber 1 until the chamber pressure has reached ten atmospheres. In the act of entrance, however, the gas initially contained in the chamber at atmospheric pressure and room temperature will be forced to the right (Fig. 1) toward the end 7 of the chamber, farthest from the inlet end 8 and will at the same time be compressed from one to ten atmospheres and will be correspondingly heated, though naturally after sufficient time has elapsed for the radiation and convection of heat from this gas to the walls of the chamber 1 and to the other gas in the chamber this heated portion at the far end of the chamber would be cooled to the temperature of the adjacent chamber walls and of the remaining gas in the chamber. For the moment, however, this initial chamber gas, now compressed at the far end of the chamber, will be hot. Likewise any part of the gas which enters the chamber with the exception of the very last will be compressed after it enters the chamber from the pressure prevailing in the chamber at the moment of its entrance up to the final pressure of ten atmospheres, and each portion of the air will be heated to an extent corresponding to the magnitude of this compression within the chamber. The first gas to enter the chamber through the inlet valve 5 will, of course, expand to the initial chamber pressure of one atmosphere, and then as it is pushed toward the far end of the chamber by the succeeding portions of inlet air, it will undergo an after-compression of one to ten atmospheres, which is the same as the extent of compression of the original chamber gas. The next portion of inlet gas will find the chamber pressure something above one atmosphere due to the presence in the chamber of the preceding portion of inlet gas in addition to the initial chamber gas, and the after-compression of this second portion of inlet gas will be something less than nine atmospheres; likewise, each succeeding portion of inlet gas will undergo an after-compression of progressively decreasing magnitude until, when the last portion of inlet gas to reach the chamber finds the chamber pressure up to its maximum value of ten atmospheres, no after-compression will be experienced, and the admission of gas to the chamber will cease whether the inlet valve 5 be then closed or not. It is apparent, therefore, that the filling of the chamber produces in the initial chamber gas a rise in temperature, and that each portion of the inlet gas to reach the chamber experiences a progressively decreasing rise in temperature, the temperature rise of the last portion of inlet gas being zero. Disregarding for the moment the mixing of the gas inside the chamber due to eddy currents or convection currents, and the heat-conducting action of the chamber walls, the gas temperature in the chamber at the completion of the inflow varies from room temperature at the inlet end 8 to a theoretical value at the far end 7 expressed by the equation $$T_1 = T \left\{ \frac{P_1}{P} \right\}.29$$

in which T and $T_1$ are the initial and final absolute temperatures, and P and $P_1$ the initial and final absolute pressures. With an initial temperature of 60° F., corresponding to an absolute temperature of 519° F., and an initial and final pressure of one and ten atmospheres, respectively, at the far end 7 of the chamber, it is found that the final temperature at the far end will be approximately 1012° absolute, or 553° F., giving a range of temperature along the chamber of 553°—60°=493° F. Now if immediately upon the completion of the inflow the inlet valve 5 be closed, and the outlet valve 6 be opened, and the gas contained in the chamber under a pressure of ten atmospheres be discharged through the outlet pipe 3 into the atmosphere, it will be found that in spite of the heated condition of practically all of the chamber gas, only gas of the original temperature of 60° F. would be emitted through the outlet valve because all parts of the chamber gas leave the chamber under the same pressure at which they entered it. For example, a gas portion that entered the chamber when the chamber pressure had attained two atmospheres experienced an after-compression of 10—2=8 atmospheres, and was pushed by the succeeding inlet gas portions approximately $\frac{8}{10}$ of the distance to the far end of the chamber, since the gas extending throughout the whole chamber at two atmospheres pressure were gradually pushed toward the far end as the pressure rose, until it could only extend $\frac{2}{10}$ of the distance from the far end 7 toward the near end of 8 when the chamber pressure had attained ten atmospheres; now as the discharge progresses this selected gas portion will be permitted to travel gradually toward the inlet end 8 (toward the left, Fig. 1) and it will reach the inlet end when the chamber pressure has dropped to two atmospheres, since by hypothesis there are always two volumes of gas portions between the selected gas portion and the far end 7 of the chamber. From this it will be clear that each gas portion undergoes within the chamber an expansion equal to its compression therein; so that the temperature rise of each gas portion effected by the compression is balanced by an equal temperature drop of that gas portion due to expansion, neglecting losses. Since all of the gas passing through the single outlet valve 6 is at a room temperature, a modification of the apparatus is necessary in order that practical use may be made of the unequal distribution of heat through the chamber-gas immediately at the close of the inflow.

Referring now to Fig. 2 for an embodiment of such a modification, we have as before a chamber 1 provided with a constant-pressure source 4 of gas that may be admitted to the chamber through the inlet pipe 2 and inlet valve 5, but in this case the outlet pipe 3 and outlet valve 6 are placed at the end 7 of the chamber, farthest removed from the inlet end 8. Assume after the inflow has been completed and the chamber gas is at ten atmospheres pressure, that the gas temperature is highest at the far end, as previously outlined in connection with Fig. 1. If now, before equalization has taken place in the chamber-gas, the outlet valve 6 at the far end 7 of the chamber be opened and the pressure in the chamber released after the inlet valve 5 is closed, it will be found that at first gas of a much higher temperature than room temperature will leave through the outlet valve. This temperature, however, gradually diminishes until when the pressure inside the chamber is reduced to about one-half maximum, the temperature of the issuing gas has fallen to room temperature and continues to fall until the chamber temperature has been reduced to atmospheric, when a considerably lower temperature than the original temperature is reached. In other words, a differentiation or unbalancing of the heat-content of the gas portions has taken place; and from an initial supply of ten volumes of gas at room temperature, there is obtained about five volumes of warmer gas and about five volumes of cooler gas, the increase in heat-content of the warm gas equaling the decrease in heat-content of the cool gas.

Then operating under the assumed pressure and initial temperature condition, the gas undergoing this temperature differentiation is changed theoretically from a uniformly distributed temperature of 60° F. to an unevenly distributed temperature, varying from minus 193° F. to plus 550° F. Furthermore, as indicated above, the quantity of heat which the gas contains after this temperature differentiation has been neither increased nor diminished, but is equal to the heat quantity which it originally contained, the heat having simply been forced to assume an uneven distribution. In other words, the operation is preferably substantially adiabatic. The above is on the assumption that the gas follows the laws of Marriotte and Gay-Lussac, and, as is well known, gases that are liquefied on a commercial scale, depart somewhat from the characteristics prescribed by these laws. When air, for instance, is the gas used, slightly lower temperatures have been observed, of the magnitude of $\frac{1}{2}$° F. per atmosphere pressure-difference between the compressed and expanded air.

It will be observed that in order to obtain a temperature differentiation the gas which issues hot issues preferably at an exit pressure higher than its inlet pressure. In other words, the compression within the chamber of such gas portions during the inflow is preferably greater than the expansion occurring within the chamber during the hot outflow. On the other hand, the gas which issues cool issues preferably at a pressure less than the inlet pressure of the gas, in which case there is ordinarily an after-compression of smaller magnitude than the after-expansion. In other words, the temperature differentiation depends upon the pressure difference with which the respective parts enter and leave the chamber. The greater these differences, the greater will theoretically be the temperature differences.

It follows, therefore, that with the apparatus of Fig. 1, where the exit pressure of each gas portion is neither greater nor less than its inlet pressure, the temperature differentiation will be practically zero, while with the modification illustrated in Fig. 2, where the gas having been subjected in the chamber to the greatest compression undergoes the least expansion, and vice versa, the temperature ranges attainable are theoretically a maximum. Or, the apparatus of Fig. 2 may be used with the inflow continuing through the period of time allowed for the hot outflow, giving substantially zero expansion for the hot gas, and increasing in this way its net chamber-compression and thereby its average exit temperature. In this way, the chamber will at the end of the hot outflow be filled with gas at normal or inlet temperature, which can then be discharged and the cold of its expansion used.

In order to reduce the losses that would attend the use of apparatus made in accordance with Fig. 2, the hot exit and the cold exit may be located in widely different parts of the chamber 1, as in Fig. 3, so that no part of the chamber walls will be alternately subjected to high and low temperatures with the attendant loss of efficiency through heat absorption. In the apparatus of Fig. 3 the inlet valve 5 controlling the admission of gas from the constant-pressure source 4 is opened and closed at appropriate intervals by the cam illustrated conventionally at 9. The hot-outlet pipe 3, as in Fig. 2, is at the far end 7 of the chamber, and is controlled by the hot-outlet valve 10 actuated, in the present instance, through the cam 14′. Instead of exhausting the cold gas and hot gas through a single exit pipe as in Fig. 2, the cold exit is here arranged at the inlet end 8 of the chamber, the gas issuing cold passing through the cold-outlet pipe 12 in which is located the cam-operated cold-outlet valve 13. It will be seen that with this arrangement the heat-content of the hot-outlet gas may be used for heating or other purposes by passing the hot gas through a heat-utilizing device illustrated conventionally at 14, while the cold outlet gas in the pipe 12 may be passed through cold-utilizing apparatus indicated at 15 to serve there the purpose of extracting heat from contiguous substances.

The sequence of events in this apparatus is as follows: With the cam shaft 16 driven at a constant speed as from the pulley 17 the three cams 9, 14', 11 are operated successively to open first the inlet valve 5 to raise the chamber-pressure from one to ten atmospheres; then the hot-outlet valve 10 is held open until the issuing gas is no longer above room temperature (which occurs when the chamber-pressure has dropped to approximately one-half maximum) whereupon valve 10 closes; then the cold-outlet valve 13 is held open while the chamber-pressure drops to one atmosphere, the last of the issuing gas being the coldest for the reasons above stated.

While the time for each cycle of operations is of course subject to variation within wide limits, it has been found in practice that satisfactory results are obtained at a speed of operation represented by from ten to one thousand cycles per minute. Certain limiting features that influence the selection of this working speed are on the one hand the advisability of acting before an appreciable equalization has occurred, and on the other hand by the speed values above which it would be expensive or difficult to operate the cams and valves.

It will be noticed that at the beginning of the first cycle the chamber-gas is at room temperature, while at the end of that cycle and the beginning of the next the chamber-gas is considerably cooler. This means that the figures given above for the temperatures attained apply only to the first cycle of operations. The temperatures for succeeding cycles, while of the same order, will be to some extent different, but as the calculation of such subsequent temperatures is not a simple matter, it need not be discussed here, save in passing.

Since there is a progressive lowering of the temperature both at the hot exit during the hot outflow and at the cold exit during the cold outflow, it would be feasible to provide a plurality of hot outlets and cold outlets with valves operated in succession so that the first fraction of the hot gas would issue into one hot system, the next fraction into another hot system, and so on, the first fraction of cold gas issuing into one cold system, the next fraction into another cold system, and so on. In this manner, higher temperature differences can be obtained, since the first hot system would have a higher temperature than would a single hot system, and likewise the last cold system to receive gas would have a lower temperature than could be attained if all the cold gas were caused to issue into a single cold system.

In the types of apparatus illustrated thus far the issuing gas both hot and cold has been exhausted into the atmosphere without any attempt being made to save whatever useful energy it might have in the form of pressure. A considerable economy can be effected by saving the pressure of the gas issuing through the hot outlet since the average pressure in this hot system is not far from half the maximum pressure prevailing in the chamber at the close of the inflow. Referring now to Fig. 4 for an illustration of a differentiator with a closed hot system, I employ as before a chamber 1 with provision for passing the hot-exit gas through first a hot-outlet valve 10, then a heat-utilizing device 14 and then a cooling-jacket 18,— provided the gas has not been cooled to room temperature by its passage through the heat-utilizing device 14; from the cooling-jacket the gas may be re-admitted to the chamber 1 whenever the first inlet valve 19 is open. The sequence of events is as follows: Assuming the chamber-gas at atmospheric pressure and the cam-shaft 16 rotating at the proper speed, the first inlet valve 19 is first opened by its cam 20 long enough to permit cooled gas from the hot system and its pressure-equalizing reservoir 21 to pass into the chamber 1; when the chamber-pressure equals the pressure prevailing in the hot system and reservoir 21, the first inlet valve 19 closes; thereupon the second inlet valve 22, leading from the constant-pressure source 4, is opened by its cam 23, raising the chamber-pressure to maximum. The next event is the issue of hot gas from the far end 7 of the chamber through the hot-outlet valve 10, this gas passing through the heat-utilizing device 14 and into the reservoir 21 to neutralize the slight drop in pressure caused during the first inlet event by the flow of cooled gas from this hot system through the first inlet valve 19 into the chamber. It will thus be seen that the hot system by virtue of the reservoir 21 may approximate a constant-pressure system, or at least the pressure range is restricted; and since this pressure is the pressure prevailing at the end of the hot-outflow, that is, about half the maximum chamber-pressure, the constant-pressure source 4 is called upon to supply only about half as much gas per cycle as in the apparatus of Fig. 3. This results in a compressed-air economy of practically 50% over that obtained with the apparatus of Fig. 3, for similar heat-differentiating results. And since the final chamber-pressure at the end of the hot outflow is equal to the constant pressure prevailing in the hot system, whether the hot-outlet valve 10 is closed exactly at the proper time or not, the closed hot system offers a simple means for dividing the hot and cold discharges so that the proper amount of gas will automatically be conveyed through the hot circuit as well as through the cold circuit and eliminates, therefore, the necessity of producing the required result by carefully timing the hot-outlet valve 10. This gives a certain automatic regulation of the pressure prevailing in the closed hot-system, which in practice is so pronounced that operation can be started without consideration of the initial pressure therein. It has been found that after a few cycles the hot-system pressure attains automatically the desired value of approximately one-half the maximum chamber pressure, and that the hot-system pressure is maintained automatically at this value.

As in the apparatus of Fig. 3, the progressive lowering of the gas temperature, both at the hot outlet and the cold outlet, may be made available for the production of greater temperature ranges by providing a plurality of hot outlets and cold outlets with valves operated in succession. In this way, as in the modification described above for Fig. 3, the temperature in the first hot system to receive gas would be fairly close to the initial maximum temperature of the hot gas, while with a single hot system the average temperature of the gas is, roughly, the mean of the maximum gas temperature and room temperature. Likewise the temperature in the last of the cold systems to receive gas would be much lower than if a single cold system were provided, due again to the progressively decreasing temperature of the issuing gas as the cold outflow progresses. In the present instance, an economy in addition to that of increased temperature range is gained by multiplying the number of hot-outlet systems, because in this way the pressure prevailing in the first hot system to receive gas will be not far from the maximum chamber pressure, and if, during the inflow, the chamber is charged first with gas from the last hot system and finally with gas from the first hot system, the chamber-pressure at the moment of opening the valve 22 from the constant-pressure supply 4 will be higher than with a single hot system, because the pressure prevailing in the first hot system to receive gas is higher than the pressure obtainable with a single hot system. Balanced against these advantages of increased temperature range and compressed-air efficiency are of course such factors as the additional cost and complication of apparatus provided with more than two outlet systems.

Further economy may be effected in the compressed air used, by closing both the hot and cold systems, using the air in both systems over and over, except for leakage, and replacing the one or more constant-pressure reservoirs by a single reservoir whose pressure controls, or is responsive to, the periodic variations in pressure in the chamber. Such an apparatus is illustrated diagrammatically in Fig. 5, in which the chamber 1 is provided with an inlet check-valve 24 and a cam-operated cold-outlet valve 13, both at the near end 8 of the chamber, with a cam-operated hot-outlet valve 10 at the far end 7. The hot system as before includes, if desired, a heat-utilizing device (not shown) and a cooling-jacket 18 to cool the air down to approximately room temperature before it reënters the chamber 1 through the inlet check-valve 24. In this embodiment of the invention there is a closed cold system comprising the refrigerator or other cold-utilizing device 15, the cold air passing successively through the cold-outlet valve 13, refrigerator 15 and check-valve 25, back to the inlet check-valve 24, through which the air from the cold system, together with the air from the hot system, is caused to reenter the chamber 1, as will now be indicated.

The cycle of events is as follows: Assume that the piston 26 is at the bottom of the cylinder 27, and is driven by fly-wheel or pulley 17 (Fig. 5), atmospheric pressure throughout the entire system, and the cam-operated valves 10, 13 for the hot and cold outlets, respectively, both closed. Now as the piston 26 rises, the air-pressure in the cylinder 27 increases and air is forced from the cylinder through the pipe 28 into the entire hot system and into the cold system as far as the check-valve 25, which prevents this air at approximately room temperature from entering the refrigerator 15. As the air-pressure in these parts rises above the atmospheric pressure in the chamber 1, the inlet check-valve 24 opens and the chamber is charged up to maximum pressure, at which time the piston 26 has reached the upper end of its stroke. As compression now ceases the inlet check-valve 24 closes of its own accord, preventing the egress of chamber air during the downward movement of the piston. At this time the cam-operated hot-outlet valve 10 opens, allowing the hot air at the upper or far end 7 of the chamber to issue through the hot-outlet valve 10, cooling jacket 18 and pipe 28 into the cylinder 27, as the piston 26 moves downward; by the time this hot-system air reaches the pipe 18 and cylinder 27, it is of course cooled to a temperature not far from room temperature, so that the pump-mechanism is not subjected to extremes of temperature. When the piston is about half way down and the chamber-pressure reduced to about one-half maximum, the hot outflow is terminated by the closing of the hot-outlet valve 10, and thereupon the cold-outlet valve 13 is opened through its cam-controlled operating mechanism to allow the cold-chamber air to issue through the cold-outlet valve 13, refrigerator 15 and check valve 25 toward the cylinder 27, following the piston 26 through the remainder of its downward, or expansion, stroke. If the cold air that has passed through the refrigerator 15 is still below room temperature, its temperature is raised by its passage through part of the pipe or temperature neutralizing device 18 on its way to the cylinder 27, so that the cylinder 27 is subjected neither to very high nor low temperatures. Thus during or following the downward stroke the piston furnishes mechanical work almost equal to the mechanical work supplied to the piston during the upward or compression stroke. The net energy loss, due to such factors as friction, thermodynamic conversion and leakage may be supplied in the form of mechanical work through the pulley 17 or other power-transmitting means, from a suitable source, not illustrated in the drawings. The quantity of air in the apparatus is maintained constant by an intake check-valve 29 in the cylinder 27, serving to admit air at atmospheric pressure as the piston 26 approaches its lowermost position, if any leakage has taken place during the cycle just ending.

In the apparatus of Fig. 5 it has been seen that there is one cycle of operations of the piston for each cycle of operations of the heat-differentiator, requiring, naturally, a larger pump than if the compression and expansion could each be accomplished during a plurality of strokes of the piston. Such an arrangement might well be provided as a modification of the apparatus of Fig. 5. The valve mechanism would be more elaborate than in the apparatus of Fig. 5, but this might be compensated for in an engineering sense by the attendant reduction in the dimensions and operating torque of the pump mechanism. In this connection it may be noted that the pump mechanism is illustrated simply as an example of compression and expansion means and that the invention is not limited to any specific type of such means. And that the chamber, while indicated conventionally as an elongated cylinder, may take any one of a variety of suitable shapes.

While the apparatus of Fig. 5 has been described as operating with a minimum pressure equal to atmospheric, such a limitation is not necessary. In fact, the minimum pressure may be of any suitable value, above or below atmospheric, provided of course that the intake check-valve 29 lead from a source of gas at the assumed pressure above or below atmospheric, instead of leading simply from the atmosphere as in Fig. 5.

In the apparatus thus far described, both the hot gas and the cold gas have been brought back to normal temperature after undergoing a single differentiation. As a modification of such single-stage apparatus there is illustrated in Fig. 6 a multiple-stage differentiator in which the gas portions are not brought back to normal temperature after a single differentiation, but pass through several stages, operating at successively different average temperatures. By such an arrangement the temperature range is increased for a given pressure range, to an extent depending, *inter alia*, on the number of stages in the cycle of operations. Such a multiple-stage heating or cooling adapts itself particularly well for the liquefaction of the so-called permanent gases, by permitting larger temperature ranges without requiring excessively high or low pressures. This multiple-stage embodiment of the present invention is illustrated in Fig. 6 in connection with a regenerator, and in Fig. 7 the regenerator is replaced by a recuperator which, instead of being subjected alternately to hot and cold gases, has a flow of hot and cold gases through separated portions, the heat exchange being effected in the recuperator through the walls or partitions separating the hot and cold gases. In both of these figures the closed-system arrangement of Fig. 5 is followed, with a pump performing one cycle per heat cycle and operating at a minimum pressure equal to atmospheric; though it will be obvious that the multiple-stage devices of Figs. 6 and 7 might well be associated with other means for effecting the differentiation.

The terms "regenerator" and "recuperator" mentioned above are employed herein to identify the heat-storing and transferring devices referred to herein. These terms have been adopted from the art of preheating furnace gases. The regenerator, as described in connection with Fig. 6, for example, may comprise a chamber filled with substance such as shot or other material capable of taking up heat during the passage therethrough of relatively warmer gas, and giving off heat during the passage therethrough of relatively cooler gas. In this device the warm and cool gases pass through the regenerator alternately and in opposite directions. The recuperator, as described in connection with Fig. 7, for example, may comprise a chamber having two separate conduits for the relatively warm and cool gases, with the intervening space occupied by a substance capable of transferring the heat from the warmer to the cooler gas.

Referring now more particularly to Fig. 6, there is illustrated at 26 a piston adapted to reciprocate within a cylinder 27 provided with an intake check-valve 29. In this case there are four differentiating chambers 1, each provided with an inlet check-valve 24, the cam-operated hot-outlet valve 10 at the opposite or far end 7 of the chamber and the cam-operated cold-outlet valve 13 at the near end 8 of the chamber. At the beginning of the cycle of operations we may assume the piston 26 to be at the bottom, the hot and cold outlet valves 10, 13 all closed and atmospheric pressure prevailing throughout. As the piston rises the air in the cylinder 27 is forced through the pipe 28 and device 18, to the regenerator 30, and thence through the four inlet check-valves 24 to each of the four chambers 1. Since the hot and cold outlet valves 10, 13 are all closed, the admission of air otherwise is prevented. When the piston 26 reaches the top of its stroke the inflow is terminated by the automatic closing of the four inlet check-valves 24 as soon as further compression ceases, and as the piston begins its downward or expansion stroke the hot outflow begins simultaneously with the opening of the cam-operated hot-outlet valves 10. The discharge of hot air from the far end 7 of the upper or hottest chamber 1 takes place as in Fig. 5 through the corresponding hot-outlet valve 10, thence through the cooling jacket 18 and pipe 28 to the cylinder 27. The hot gas in the far end of the next chamber 1, however, does not pass so directly to the pump cylinder but flows through the second hot-outlet valve 10, pipe 31, first or hottest section A of the regenerator 30, pipe 32 and thence through the cooling-jacket 18 and pipe 28 to the cylinder 27. In like manner the hot gas in the far end 7 of the third chamber 1 passes through the third hot-outlet valve 10, pipe 33, to the second or next hottest section B of the regenerator; thence through the first or hottest section A to the pipe 32, cooling jacket 18, pipe 28 and cylinder 27; and the hot gas in the far end of the fourth chamber is caused to pass successively through the third, second and first sections C, B, A of the regenerator toward and into the cylinder 27. It will be noted that the hot gas from a given chamber passes into the next warmer section of the regenerator.

When the piston is half way down, with chamber-pressure approximately one-half maximum, the position of the cam-shaft 16 is such as to close the hot-outlet valves 10 and open the cold-outlet valves 13, whereupon the abstraction of the cold air at the near end 8 of each chamber takes place as follows: From the first or hottest chamber the cold air passes downward (Fig. 6) into the second or next to hottest section B of the regenerator 30, thence upward through the hottest section A to the pipe 32, cooling jacket 18, pipe 28 and cylinder 27. The cold air from the second or next hottest chamber passes likewise downward into the next lower or colder section C of the regenerator and thence upward toward and into the cylinder 27. And the cold air in the third and fourth chambers respectively passes downward through the next colder section D, E of the regenerator and then upward through the successively warmer sections of the regenerator through the cooling jacket and toward the cylinder 27. Since the pressure prevailing in the entire system does not fall below atmospheric owing to the automatically acting intake check-valve 29, it follows that not all of the air abstracted from the cold end 8 of the chambers reaches the cylinder 27, some of it naturally remaining in the regenerator 30. As in Fig. 5, leakage is compensated for by the intake check-valve 29 in the cylinder 27, admitting air at atmospheric pressure as the piston 26 approaches its lowermost position, if any leakage has taken place during the cycle then ending. And as in Fig. 5, the slight amount of external power needed to compensate for losses due to friction, conversion, leakage and other factors is furnished from a source of power (not shown) through power-transmitting means indicated conventionally by the pulley 17.

In this apparatus, as pointed out above, the four chambers are maintained at temperature averages decreasing progressively from the hottest chamber at the top to the coldest chamber at the bottom; and this is effected by the regenerator 30, the average temperature of which likewise decreases progressively, from the hottest section A at the top to the coldest section E at the bottom, together with interconnecting pipes and valves so arranged and timed as to cause the relatively hot gas from a given chamber to issue into the next hotter section of the regenerator relatively to the regenerator section and from which the air entered, while the cold gas from that chamber issues later into the next colder section of the regenerator. By this means the air issuing through the hot outlet valves 10 and which by differentiation in the chambers has become relatively hot, is returned to the regenerator at a regenerator section of correspondingly higher temperature, while the air issuing from the chambers through the cold outlet valves 13 and which by differentiation has become relatively cold, is returned to the regenerator at a regenerator section of correspondingly lower temperature. In this way the regenerator is forced to assume a range of temperature the extremes of which correspond to the sum of the temperature ranges of the several differentiating chambers. I have found that even with moderate pressure ratios and with the hottest regenerator section maintained at approximately room temperature, the coldest regenerator section may be maintained at a temperature low enough for the liquefaction of air. As in the preceding embodiment of the invention illustrated in Fig. 5, the cylinder 27 is protected from high and low-temperature gas by the temperature neutralizing device 18, so that no great temperature ranges are experienced at the pump mechanism. By arranging the apparatus so that the coldest section is at the bottom, the collection there of liquefied gas is facilitated and this liquefied product of the apparatus may be withdrawn through the valve 34.

Turning now to Fig. 7, we find a multiple-stage differentiator illustrated in connection with a recuperator or similar device adapted to facilitate the interchange of heat between two streams of gases separated from each other by walls or partitions. In the apparatus here illustrated for convenience as operating in three stages, there is as before, a pump mechanism driven from a source of power (not shown) through the pulley 17 and comprising a piston 26 adapted to reciprocate within the cylinder 27. The three cam-operated valves 5, 10, 13, serve respectively for the inlet, hot-outlet and cold-outlet of gases flowing through the three differentiating chambers 1. As in Fig. 6, the valve arrangement is simple and all working parts of the pump mechanism operate under moderate temperature ranges.

Assume the piston to be at the bottom of its stroke, all the valves closed and atmospheric pressure prevailing through the system. The cycle of operations begins as before with the inflow effected in this instance, by the opening of the cam-operated inlet valve 5, simultaneously with the commencement of the upward stroke of the piston 26. As the piston rises, the air in the cylinder is compressed and forced upward through the temperature neutralizing jacket 18 and inlet valve 5 into the three differentiating chambers until the pressure in said chambers attains its maximum at the end of the upward stroke of the piston. The inflow now ends and the hot outflow begins by the simultaneous closing of the inlet valve 5, opening of the hot-outlet valve 10 and downward movement of the piston 26 on its expansion stroke. Gas now issues from the far end 7 of the upper or hottest chamber directly through the hot-outlet valve 10 and jacket 18 into the cylinder 27. The hot gas in the far end 7 of the second or next hottest chamber, however, passes through the top or hottest section A of the recuperator on its way to the hot-outlet valve 10, jacket 18 and cylinder 27. Similarly the hot gas in the far end of the third or coolest chamber passes through the second or next hottest section B of the recuperator, thence through the hottest section A of the recuperator to the hot-outlet valve 10, jacket 18 and cylinder 27. Thus the relatively hot gas from a given chamber enters the next hotter section of the recuperator. When the piston is about half way down, with chamber-pressure in the neighborhood of one-half of its maximum value, the hot-outlet valve 10 closes and the cold-outlet valve 13 opens, whereupon, the cold gas from the near end 8 of the first or hottest chamber passes downward into the next cooler section B of the recuperator, thence upward through the hottest section A thereof, whence it passes through the cold-outlet valve 13 and temperature neutralizing jacket 18 into the cylinder 27. The cold gas in the second chamber passes into the next colder section C, thence upward through the warmer sections B, A toward and into the cylinder 27. The cold gas from the near end 8 of the coldest chamber passes downward through the coldest section D of the recuperator, thence upward through the progressively warmer sections C, B, A toward and possibly into the cylinder 27. As in Fig. 6, the apparatus is so designed that the air issuing from the differentiating chambers through the hot-outlet valve 10, and which by differentiation has become relatively hot, enters the recuperator at a point of correspondingly higher temperature, while the air issuing from these chambers through the cold-outlet valve 13, and which by differentiation has become relatively cold, is caused to enter the recuperator at a point of correspondingly lower temperature. And, as in Fig. 6, the recuperator is forced to assume a range of temperature, the extremes of which correspond to the sum of the temperature ranges of the several differentiating chambers.

The various modifications of Fig. 7, such as the substitution of an open system for the hot or cold gases or the sub-division of the hot or cold systems, or the maintenance of a minimum pressure other than atmospheric, or the use of pump and valve mechanism adapted to effect a plurality of pump cycles per heat cycle or the operation in succession of the events in adjacent chambers need not be considered at length, since the changes necessary to adapt the apparatus of Fig. 7 to such modified embodiments of the invention have been already described or indicated with similar modifications in the apparatus of preceding figures.

In the apparatus of Fig. 7 and the preceding figures, it is found that there is an increase or decrease (as the case may be) of the average working temperature of the several portions of the apparatus with each succeeding cycle of operations, of a magnitude depending upon the pressure ratios employed. But this increase or decrease may be augmented and thus the ratio of temperature-range to pressure-range increased as the apparatus continues to operate, by certain modifications described in Fig. 8 in connection with a regenerator, and in Fig. 9 in connection with a recuperator. In these figures we revert to the open-system arrangement of Fig. 3 with the inlet gas furnished exclusively from a suitable source maintained at constant pressure; although it will be obvious that many, if not all, of the features of the preceding figures and their variations, as indicated in the specification, may be incorporated into apparatus operating with the self-intensifying features of the apparatus of Figs. 8 and 9. And, again, it is to be understood that these numerous modifications are not described in detail in connection with the structures now to be explained, for the reason that the changes needed to adapt such structures to the features of construction of such modifications will be apparent from the preceding description without further elaboration.

Referring to Fig. 8, there is shown at 1 a differentiating chamber provided with the cam-operated valves, 10, 35, 36, 37, 38, and associated therewith a regenerator 39, through which pass alternately, in opposite directions, the cold-outlet gas from the valve 35 and part of the inlet gas from the constant-pressure source 4. The remainder of the inlet gas reaches the differentiating chamber 1 through the cam-operated valve 36. As in Fig. 3, the hot-outlet gas through the valve 10 and the cold-outlet gas through the valve 35 both exhaust into the atmosphere, thereby identifying this apparatus with the open-system arrangement of Fig. 3 as distinguished from the closed-hot-system arrangement of Fig. 4 and the completely closed systems of Figs. 5, 6 and 7.

The cycle of operation is as follows: Assume atmospheric pressure and normal temperature throughout, and all the valves closed. The cycle of operations begins with the first inflow, during which the cam-operated valve 36 at the near or inlet end 7 of the differentiating chamber 1 is opened to admit air from the constant-pressure source 4. When the chamber-pressure reaches approximately half its maximum value (this fraction may be varied within wide limits), the valve 36 closes, and during the next succeeding part of the cycle, which may for convenience be termed the second inflow, the valves 38, 35 are opened to admit air from the constant-pressure source 4, downward through the regenerator 39 to the chamber 1, raising the chamber-pressure to maximum. The cam mechanism now serves to close the valves 38, 35 and simultaneously to open the hot-outlet valve 10, and during the ensuing hot-outlet event of the cycle, the hot air at the upper or far end 7 of the chamber escapes to the atmosphere until this gas, of progressively decreasing temperature as in the previous types of apparatus, reaches approximately normal temperature simultaneously with the drop of chamber-pressure to half-maximum or thereabouts. Then the cold-outflow takes place upon the closing of the valve 10 and opening of the valves 35, 37, permitting the cold air from the near or inlet end 8 of the differentiating chamber to pass upward through the regenerator to the atmosphere. This completes the cycle.

It will be noted that now instead of having all parts of the apparatus at room-temperature, the lowermost part of the regenerator has a temperature somewhat lower than before owing to the fact that during the cold-outflow the cold gas passed first through this lowermost section of the regenerator, and, naturally, abstracted heat from the walls thereof, in its passage upward to an atmospheric exhaust at 37. It will be seen therefore that at the beginning of the second cycle the upper end of the regenerator is approximately at room temperature, as before, while throughout the rest of the regenerator there is a progressively decreasing temperature reaching a minimum at the lower end 40. During the first inflow of the second cycle the air admitted through the valve 36 enters the chamber at room temperature and during the second inflow is pushed with a piston-like action toward the far or hot end 7 of the chamber by the entrance of inlet air which has passed downward through the regenerator on its way to the near end 8 of the chamber. Remembering now that the regenerator is progressively cooler toward the bottom, it will be seen that the air admitted during the second inflow is progressively cooled, as it passes downward through the regenerator and that it enters the differentiating chamber at a temperature below normal. Since this air that is thus admitted is the air that issues during the cold-outflow, the importance of having it pre-cooled will be appreciated: for by virtue of this pre-cooling, this air issuing during the cold-outflow of the second cycle is colder than the air issuing during the cold-outflow of the first cycle, because it was pre-cooled, while the corresponding air of the first cycle was not pre-cooled. This means that the regenerator temperature will be lower, and that during the second inflow of the third cycle, the incoming air will be pre-cooled to a greater extent; from this it follows that the temperature of the air during the next cold-outflow will be lower, the regenerator cooled further, and finally as the regenerator becomes colder with each succeeding cycle of operations, a temperature at the coldest portion of the regenerator is reached that is sufficiently low for the liquefaction of air or for the particular purpose in hand, whatever it may be. This self-intensifying action is augmented by having the regenerator operate with the hot and cold gases flowing in opposite directions.

Instead of the regenerator of Fig. 8 a recuperator may be used as indicated in Fig. 9. Here, as before, the inlet operation is divided into two parts, the first comprising the admission of air from the constant-pressure source 4 directly to the chamber 1 through the cam-operated valve 36, while during the second inflow the raising of the chamber-pressure to maximum is completed by passing the air from the constant-pressure source 4 downward (Fig. 9) through the heat-exchanging device or recuperator 41 and valve 42 into the chamber 1. The hot-outlet and cold-outflow are as in the apparatus of Fig. 8, with the exception that since the second inlet air and the cold-outlet air are now physically separated from each other the arrangement of valves is somewhat different: The cold-outlet valve 37 of Fig. 8 is no longer needed, while the outlet of cold air from the chamber takes place now through a cam-operated valve 43 instead of through the same valve that serves for the admission of air during the second inflow.

In practice, it is advantageous to erect the differentiating chambers vertically, as shown in certain of the figures, with the hot extremity at the top in order to make use of the density difference of the hot and cold gases for minimizing temperature equalization.

From the above description, taken in connection with the accompanying drawings, it will be seen that there are provided a number of types of apparatus adapted to fulfil the present-day engineering requirements of efficiency in cost and operation, and that by means of these illustrated embodiments of the invention the enumerated objects of the invention are attained and other advantages secured.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention which, as a matter of language, might be said to fall therebetween.

Having described my invention, what I claim as new and desire to secure by Letters Patent is:

1. Apparatus of the character described, comprising, in combination, means for disturbing the heat-content distribution in a fluid, means for separating the portion of fluid of increased heat-content from the remainder of the fluid, and means for abstracting said remainder from said first means.

2. Apparatus of the character described, comprising, in combination, means for disturbing the heat-content distribution in a fluid substantially adiabatically, means for separating the portion of increased heat-content from the remainder of the fluid, and means for abstracting the remainder of the fluid from said first means, whereby said first portion may be utilized to deliver energy and said remainder to absorb energy.

3. Apparatus of the character described, adapted to operate in successive cycles and comprising, in combination, means for disturbing during each cycle the heat-content distribution of a fluid substantially adiabatically, means for separating during each cycle, prior to equalization, the portion of increased-heat content from the remainder of the fluid, and means for abstracting during each cycle the remainder of the fluid.

4. Apparatus of the character described, adapted to operate in successive cycles and comprising, in combination, means for disturbing during each cycle the heat-content distribution of a fluid substantially adiabatically, means for exhausting during each cycle, such portions of the fluid as may be caused to abstract from said chamber more heat than said portions had upon entering the said chamber, and means for thereupon exhausting the remaining fluid at a temperature below its entering temperature.

5. Apparatus of the character described, adapted to operate in successive cycles and comprising, in combination, means for disturbing the heat-content distribution in a fluid, means for separating the portion of increased heat-content from the remainder of the fluid, and means for thereupon exhausting from the chamber such portions as may be abstracted while undergoing an expansion within the chamber greater than their previous compression within the chamber.

6. Apparatus of the character described, adapted to operate in successive cycles and comprising, in combination, means for disturbing the heat-content distribution in a fluid, means for separating the portion of increased heat-content from the remainder of the fluid, beginning with the fluid portion that issues at the highest temperature, and means for abstracting said remainder from said first means.

7. In apparatus of the character described, in combination, a source of gas under pressure, a chamber communicating with said source, a valve to control the periodic admission of gas to said chamber from said source, a valve removed from said first valve to control the periodic emission of the gas undergoing compression in said chamber, and a valve adjacent said first valve to control the separate periodic emission of the gas undergoing compression in said chamber.

8. Apparatus of the character described, comprising, in combination, a chamber, a source of fluid, means for admitting fluid from said source to said chamber, whereby as the chamber-pressure increases the admitted fluid portions undergo a progressively decreasing compression within the chamber and thereby a progressively decreasing rise of temperature within the chamber, and means for exhausting from the chamber such portions as may be exhausted while undergoing an expansion within the chamber less than their respective previous compression within the chamber.

9. Apparatus of the character described, comprising, in combination, an elongated chamber of constant volume, a constant-pressure source of fluid, means for admitting fluid from said source to said chamber substantially adiabatically, and means for exhausting from the chamber such portions as may be caused to issue at a temperature above their entering temperature.

10. Apparatus of the character described, comprising, in combination, a chamber, a source of fluid, means for admitting fluid from said source to said chamber, means for exhausting from the chamber such portions of the fluid as may be caused to abstract from said chamber more heat than said portions had upon entering the said chamber, and means for thereupon emitting from said chamber such portions as may be caused to abstract from the chamber less heat than the said portions had upon entering.

11. Apparatus of the character described, comprising in combination, means for disturbing the heat-content distribution in a fluid, means for abstracting heat from said fluid, thereby lowering the heat-content of portions of said fluid, and means for removing said portions of the fluid.

12. Apparatus of the character described, comprising in combination, means for localizing in part of a fluid a portion of the heat-content of the fluid, means for abstracting said part of the fluid and means for removing the fluid of decreased heat-content.

13. Apparatus of the character described, comprising in combination, means for unbalancing the heat-content distribution in a fluid substantially adiabatically, and means for separating, prior to the equalization of the unbalanced heat-content, the fluid portion of increased heat-content from the remainder of the fluid.

14. Apparatus of the character described, comprising in combination a container, means for admitting a fluid into said container in such manner as to disturb the heat-content distribution of a fluid in said container, means for removing from said container the fluid portion of increased heat-content, and means for removing from said container the remainder of said fluid.

15. Apparatus of the character described, comprising in combination, means for disturbing the heat-content distribution in a fluid, and means for separating the portion of decreased heat-content from the remainder of the fluid.

16. Apparatus of the character described, comprising in combination, a container, means for disturbing the heat-content distribution of a fluid in said container, means for removing from said container the fluid portion of increased heat-content, and means for removing from said container the remainder of said fluid.

17. Apparatus of the character described, comprising in combination, a container, means for disturbing the heat-content distribution of a fluid in said container, means for removing from said container the fluid portion of increased heat-content, and means for removing from said container the remainder of said fluid whereby said first portion may be utilized to deliver energy and said second portion to absorb energy.

18. Apparatus of the character described, comprising in combination, a fluid circuit, a compression and expansion device, means adapted to admit compressed fluid from said device into said circuit, means adapted to admit compressed fluid from said circuit into said device, and means for so timing the events as to utilize in the expansion events of said device the energy of compression of said fluid.

19. Apparatus of the character described, comprising in combination, a source of compressed fluid, and heating means for said fluid, in which said fluid acts as a piston.

20. Apparatus of the character described, comprising in combination, a container for fluid, an inlet and an outlet adjacent opposite ends of the container, a second outlet adjacent the same end of the container as the inlet, and means adapted to open in succession said inlet, said first outlet and said second outlet.

21. Apparatus of the character described, comprising, in combination, a chamber, a constant-pressure source of fluid, means acting during each cycle to admit fluid from said source into said chamber to disturb thereby the heat-content distribution of said fluid, a heat-utilizing device, means for abstracting therethrough the fluid portions of increased heat content, a cold-utilizing device, and means for abstracting therethrough the fluid portions of decreased heat content.

22. Apparatus of the character described, comprising, in combination, compression and expansion means, a plurality of chambers, a heat-exchanging device, means acting to admit fluid from said first means through said device to the several chambers simultaneously, means for abstracting portions of said fluid from each chamber, and means for thereupon abstracting from each chamber other portions of said fluid, the fluid portions passing through said device and tending to actuate said expansion means.

23. Apparatus of the character described, comprising, in combination, expansion and compression means, a plurality of chambers, a recuperator, means acting to admit compressed fluid from said first means through said recuperator to the several chambers simultaneously, means for abstracting from each chamber certain of the fluid portions, and means for abstracting from each chamber other fluid portions, the portions abstracted passing through said recuperator and tending to actuate said expansion means.

24. Apparatus of the character described, comprising, in combination, a chamber, a heat-exchanging device, a source of compressed fluid, means for admitting fluid from said source through said device into said chamber, means for thereupon admitting fluid directly from said source into said chamber, means for abstracting portions of said fluid from said chamber, and means for thereafter abstracting other portions of said fluid from said chamber through said device.

25. Apparatus of the character described, comprising, in combination, compression and expansion means, a chamber, means acting during each cycle to admit compressed fluid to said chamber from said first means to disturb thereby the heat-content distribution in said fluid, means for thereupon abstracting from said chamber the fluid portions of increased heat-content, means for thereupon abstracting from said chamber the fluid portions of decreased heat-content, the fluid from said chamber tending to actuate said expansion means, and means for utilizing the differentiation thus produced in the heat-content of the issuing fluid portions.

26. Apparatus of the character described, comprising, in combination, expansion and compression means, a plurality of chambers, a recuperator, means acting during each cycle to admit compressed fluid from said first means through a progressively increasing number of recuperator sections to the progressively colder chambers simultaneously to disturb the heat-content distribution of the several fluid portions in each chamber, means for thereupon abstracting from each chamber the fluid portions of increased heat-content, means for thereupon abstracting from each chamber the fluid portions of decreased heat content, the portions of increased heat-content from a given chamber passing through successively warmer sections of said recuperator beginning with a section warmer than the average temperature of said chamber, the fluid of decreased heat-content passing from said chamber through successively warmer sections of said recuperator, beginning with a section colder than the average temperature of said chamber, the several fluid portions issuing from the chambers serving to actuate said expansion means, and means for protecting said first means from extremes of temperature.

27. In apparatus for utilizing fluids, means for causing differentiation of heat content in different parts of an integral body of fluid, so that one part thereof is heated and another part thereof is cooled, and means for segregating the hot and cold portions thereof.

28. In apparatus for utilizing gas, means for causing a differentiation of heat content in different parts of an integral body of gas, so that one part thereof is heated and another part thereof is cooled, and means for segregating the hot and cold portions thereof.

29. In apparatus for utilizing gas under pressure, means for causing variations of pressure to extend through an integral body of gas, thereby causing variations of the heat content in different parts of a body of gas, means for segregating the hot gas at one place and the cold gas at another, and means for utilizing the segregated hot and cold portions of the body of gas.

30. In apparatus for heat differentiation, a vessel, means for charging the vessel with compressed fluid, means for segregating in different parts of the vessel the hot and cold portions of the fluid, and means for utilizing the heat and cold developed therein.

31. In apparatus for heat differentiation by means of compressed fluid, a vessel, means for charging the vessel with the fluid, the fluid acting as a piston and thereby segregating in the vessel the hot and cold portions of the fluid, and means in different locations upon the vessel for discharging therefrom the hot and cold portions of the fluid for utilization, as described.

32. In apparatus for rendering available potential heat energy of compressed gas, in combination, means having inlet and outlet ports and of a character to receive and confine gas under compression, and means to effect in sequential steps, (*a*) admission of such gas to said first means, (*b*) expansive emission of a predetermined quantity of the gas first entering said first means during such admission (step *a*), and (*c*) expansive emission of a predetermined quantity of the confined gas remaining in said first means after the first emission (step *b*).

33. In apparatus for rendering available potential heat energy of compressed gas, in combination, means having inlet and outlet ports and of a character to receive and confine gas under compression, and means to effect in sequential steps, (*a*) admission of such gas to said first means, (*b*) expansive emission of a predetermined quantity of the gas first entering said first means during such admission (step *a*), and (*c*) expansive emission of a predetermined quantity of the confined gas remaining in said first means after the first emission (step *b*); said sequential steps being caused to recur by said second means in cycles of sufficient frequency to insure said first step of emission (*b*) prior to substantial temperature equalization in said chamber of the gas confined therein.

34. In apparatus for obtaining extra-normal temperatures, means to effect, in recurring cycles, sequential substantially adiabatic compression and expansion of successive predetermined volumes of a homogeneous gas.

35. In apparatus for obtaining extra-normal temperatures, a source of compressed gas, a chamber of fixed volume to receive and permit emission of such gas, and means to insure substantially adiabatically such admission and emission in recurring cycles.

36. In apparatus for obtaining extra-normal temperatures, in combination, a chamber of fixed volume adapted for passage therethrough of a compressed gas, and means to effect such passage, in cycles, with sequential substantially adiabatic compression and expansion in said chamber of each periodic charge of gas.

37. In apparatus for obtaining extra-normal temperature, in combination, a chamber of fixed volume having inlet and outlet ports and of a character to receive and confine gas under compression, and means to effect substantially adiabatically in recurring cycles admission of such gas to said chamber and expansive emission of a predetermined quantity of such confined gas.

38. In apparatus for obtaining extra-normal temperature, in combination, a chamber having inlet and outlet ports and of a character to receive and confine gas under compression, means to effect in recurring cycles admission of such gas to said chamber and expansive emission of a predetermined quantity of such confined gas, and means for utilizing such emitted gas to render extra-normal the temperature of the gas admitted to said chamber during a succeeding admission.

39. In apparatus for obtaining extra-normal temperature, in combination, a plurality of chambers having inlet and outlet ports and of a character to receive and confine gas under compression, means to effect in recurring cycles admission of such gas to said chambers and expansive emission of a predetermined quantity of such confined gas, and means for utilizing such emitted gas from one chamber to render extra-normal the temperature of the gas admitted to another chamber during a succeeding admission.

40. In apparatus for obtaining sub-normal temperature, in combination, a plurality of chambers having inlet and outlet ports and of a character to receive and confine gas under compression, means to effect in recurring cycles admission of such gas to said chambers and expansive emission of a predetermined quantity of such confined gas, and means for utilizing such emitted gas from one chamber to pre-cool the gas admitted to another chamber during a succeeding admission.

41. In apparatus for obtaining extra-normal temperature, in combination, a plurality of chambers having inlet and outlet ports and of a character to receive and confine gas under compression, means to effect in recurring cycles admission of such gas to said chambers, expansive emission of a predetermined quantity of such confined gas first entering said chambers during the preceding admission and expansive emission of a predetermined quantity of the remaining confined gas, and means for utilizing the gas emitted during one of said emissions to render extra-normal the temperature of the gas admitted to another chamber during a succeeding admission.

42. In apparatus for obtaining sub-normal temperature, in combination, a plurality of chambers having inlet and outlet ports and of a character to receive and confine gas under compression, means to effect in recurring cycles admission of such gas to said chambers, expansive emission of a predetermined quantity of such confined gas first entering said chambers during the preceding admission and expansive emission of a predetermined quantity of the remaining confined gas, and means for utilizing the gas emitted from one chamber during said second emission therefrom for pre-cooling the gas admitted to another of said chambers during a succeeding admission.

43. In apparatus for obtaining low temperature, in combination, a plurality of chambers having inlet and outlet ports and of a character to receive and confine gas under compression, means to effect, in sequential steps, admission of such gas to said chambers, expansive emission of a predetermined quantity of the gas first entering each of said chambers during said admission, expansive emission of a predetermined quantity of the confined gas remaining in each of said chambers after the first emission, and means for utilizing the gas emitted from one of said chambers during the second step of emission to effect pre-cooling of the gas admitted to another of said chambers during a step of admission; said sequential steps being caused by said first means to recur in cycles of sufficient frequency to insure said first emission prior to temperature equalization of the confined gas.

44. In thermo-dynamic apparatus, in combination, a chamber having inlet and outlet ports and of a character to receive and confine gas under compression, means to effect admission of gas under compression to said chamber, means to effect expansive emission of a predetermined quantity of such confined gas, means to utilize the heat conditions of said emitted gas, and means to independently utilize the pressure condition of said emitted gas.

45. The herein set forth method which includes compressing and expanding, in recurring sequence and substantially adiabatically, successive, substantially constant volumes of a fluid.

46. The method of obtaining super-normal temperature, which includes, in recurring sequence, compressing and expanding gas in confinement, and separating for relative hot utilization a portion which has undergone greater compression than expansion during such confinement.

47. The method of obtaining sub-normal temperature, which includes, in recurring cycles, compressing and expanding gas in confinement, and separating for cold utilization a portion which has undergone greater expansion than compression during such confinement.

48. The method of obtaining extra-normal temperature, which includes, in recurring sequence, compressing and expanding gas in confinement, separating for relative hot utilization a predetermined portion which has undergone greater compression than expansion during such confinement, and separating for relative cold utilization a predetermined portion which has undergone greater expansion than compression during such confinement.

49. The method of obtaining extra-normal temperature, which includes, in recurring sequence, compressing and expanding gas in confinement, separating for relative hot utilization substantially that portion which has undergone greater compression than expansion during such confinement, and separating for relative cold utilization substantially that portion which has undergone greater expansion than compression during such confinement.

50. The method of obtaining extra-normal temperature, which includes, in recurring cycles, increasing the pressure of an integral gas of substantially constant volume, decreasing the pressure thereof by emitting a quantity which is caused to issue at a pressure substantially greater than its pressure at the beginning of its compression increase, and then further decreasing the pressure thereof by emitting a quantity which is caused to issue at a pressure substantially lower than its pressure at the beginning of its compression increase.

51. The method of obtaining extra-normal temperature, which includes, in recurring sequence, compressing and expanding gas in confinement, separating a predetermined portion which has undergone greater pressure difference in one direction than in the other during confinement, and then utilizing such separated portion for rendering extra-normal the temperature of succeeding gas to be compressed and expanded.

52. The method of obtaining extra-normal temperature, which includes, in recurring sequence, compressing and expanding gas in confinement, separating substantially that portion which has undergone greater pressure difference in one direction than in the other during confinement, and then utilizing such separated portion for rendering extra-normal the temperature of succeeding gas to be compressed and expanded.

53. The method of obtaining sub-normal temperature, which includes, in recurring sequence, compressing and expanding gas in confinement, separating a predetermined portion which has undergone greater expansion than compression during confinement and then utilizing such portion to pre-cool succeeding gas to be compressed and expanded.

54. The method of obtaining extra-normal temperature, which includes, in recurring cycles and in rapid sequence, compressing and expanding substantially adiabatically successive, subtantially predetermined volumes of gas.

55. The herein set forth method which includes differentially compressing and expanding, in recurring sequence, successive confined volumes of a gas.

56. The herein described method which includes, in recurring cycles and in rapid sequence, differentially compressing and expanding successive confined volumes of a gas.

57. The method of obtaining extra-normal temperature which includes, in recurring cycles, differentially compressing and expanding gas in confinement, separating for relative hot utilization a predetermined portion which has undergone greater compression than expansion during such confinement, and separating for relative cold utilization a predetermined portion which has undergone greater expansion than compression during such confinement.

58. The method of obtaining sub-normal temperature which includes, in recurring cycles, differentially compressing and expanding gas in confinement, and separating for cold utilization a predetermined portion which has undergone greater expansion than compression during such confinement.

59. The method of obtaining extra-normal temperature which includes, in recurring sequence, differentially compressing and expanding gas in confinement, separating a portion which has undergone greater pressure difference in one direction than in the other during confinement, and utilizing such separated portion for rendering extra-normal the temperature of succeeding gas to be compressed.

60. The method of obtaining sub-normal temperature which includes, in recurring cycles and in rapid sequence, differentially compressing and expanding gas in confinement, separating a portion which has undergone greater expansion than compression during such confinement and utilizing such portion to pre-cool succeeding gas to be expanded.

61. The method of rendering available potential energy of compressed gas, which includes admitting such gas to a chamber, expansively emitting a predetermined quantity of the gas first entering said chamber during such admission, and expansively emitting a predetermined quantity of the confined gas remaining in said chamber after the first emission.

62. The method of rendering available potential energy of compressed gas, which includes effecting in rapid cycles admission of such gas to a chamber, expansive emission of a predetermined quantity of the gas first entering said chamber during such admission prior to substantial temperature equalization of the gas confined in said chamber, and expansive emission of a predetermined quantity of the confined gas remaining in said chamber after the first emission.

In testimony whereof I affix my signature, in the presence of two witnesses.

RUDOLPH VUILLEUMIER.

Witnesses:
GEO. E. HULSE,
R. S. BLAIR.